G. N. LORD & A. P. AYERS.
Fence-Post Sockets.
No. 151,300. Patented May 26, 1874.
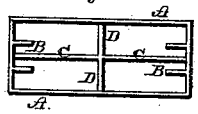
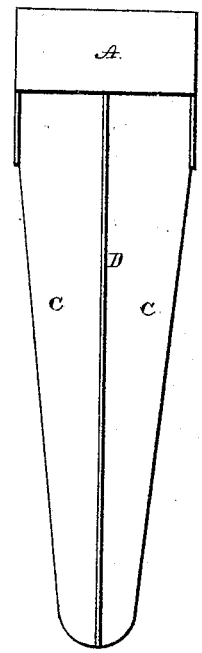
WITNESSES.
INVENTORS.

UNITED STATES PATENT OFFICE.

GILBERT N. LORD AND ALMON P. AYERS, OF BENTON HARBOR, MICHIGAN; SAID AYERS ASSIGNOR TO C. BRITAIN.

IMPROVEMENT IN FENCE-POST SOCKETS.

Specification forming part of Letters Patent No. 151,300, dated May 26, 1874; application filed October 17, 1871.

*To all whom it may concern:*

Be it known that we, GILBERT N. LORD and ALMON P. AYERS, of Benton Harbor, in the county of Berrien and State of Michigan, have invented a new and useful Improvement in Fence-Base, of which the following is a specification:

Our invention consists in a socket having flanges so arranged within that a solid post may be dispensed with in building a fence, and boards may be used instead, said socket being in combination with any suitable support or blade to be driven into the ground.

The accompanying drawing represents my invention.

A indicates a socket on the top of an ordinary iron blade, having its sides strengthened by ribs, and intended to be placed or driven in the ground to support the fence. The socket may be of any desired shape or size, and is provided inside with flanges B, which project from the sides of the socket, and are arranged at such distances that the ends of boards or strips of wood may be inserted between the flanges and the sides of the socket, thereby forming a substitute for a solid post. The object of this invention is to secure a cheap and durable fence which can be moved without injury.

We do not broadly claim a socket on a blade, such as we have described; but

What we do claim, and desire to secure by Letters Patent, is—

The socket A, provided on the inside with flanges B, and in combination with a suitable blade or support to be inserted into the ground, as and for the purpose described.

GILBERT N. LORD.
ALMON P. AYERS.

Witnesses:
 ALONZO PLUMMER,
 ROBT. E. HULL.